US012573106B2

(12) United States Patent
Stenger et al.

(10) Patent No.: US 12,573,106 B2
(45) Date of Patent: Mar. 10, 2026

(54) INFORMATION PROCESSING APPARATUS AND INFORMATION PROCESSING METHOD FOR PROCESSING OVERLAY IMAGES

(71) Applicant: Rakuten Group, Inc., Tokyo (JP)

(72) Inventors: Bjorn Stenger, Tokyo (JP); Hiya Roy, Tokyo (JP)

(73) Assignee: Rakuten Group, Inc., Setagaya-ku (JP)

( * ) Notice: Subject to any disclaimer, the term of this patent is extended or adjusted under 35 U.S.C. 154(b) by 148 days.

(21) Appl. No.: 18/224,195

(22) Filed: Jul. 20, 2023

(65) Prior Publication Data

US 2025/0029297 A1 Jan. 23, 2025

(51) Int. Cl.

| | |
|---|---|
| ***G06T 11/60*** | (2006.01) |
| ***G06T 5/77*** | (2024.01) |
| ***G06T 7/11*** | (2017.01) |
| ***G06V 20/62*** | (2022.01) |

(52) U.S. Cl.

CPC ................ *G06T 11/60* (2013.01); *G06T 5/77* (2024.01); *G06T 7/11* (2017.01); *G06V 20/635* (2022.01); *G06T 2207/20081* (2013.01); *G06T 2207/20084* (2013.01); *G06V 2201/09* (2022.01)

(58) Field of Classification Search

None

See application file for complete search history.

(56) References Cited

U.S. PATENT DOCUMENTS 7,088,870 B2 * 8/2006 Perez ........................ G06T 11/40 382/284
10,726,631 B1 * 7/2020 Ha ............................ G06T 7/73
2020/0364876 A1 * 11/2020 Mohan ............... G06V 10/7753
2022/0301118 A1 9/2022 Frey et al.

(Continued)

FOREIGN PATENT DOCUMENTS

JP 2023-500203 A 1/2023
JP 2023-143628 A 10/2023
WO 2021/230863 A1 11/2021

OTHER PUBLICATIONS

Xiangzhi Wang, "Precise Human Removal and Inpainting Using Mask RCNN and LaMa", The 4th International Conference on Computing and Data Science (CONF-CDS 2022), 2023, pp. 180-199 (20 pages).

(Continued)

*Primary Examiner* — Yanna Wu

(74) *Attorney, Agent, or Firm* — Sughrue Mion, PLLC

(57) ABSTRACT

An information processing apparatus includes: a region detection unit configured to input a first image containing an object and additional information to a first machine learning model and cause the first machine learning model to detect a region of the additional information; a mask generation unit configured to generate a mask to be applied to the region of the additional information from information of the region of the additional information; and an image output unit configured to input the mask generated by the mask generation unit and the first image to a second machine learning model and cause the second machine learning mode to output a second image that is different from the first image, the second image being an image in which the additional information is erased from the first image and a region in the first image from which the additional information has been erased is inpainted.

13 Claims, 12 Drawing Sheets

(56) References Cited

U.S. PATENT DOCUMENTS

2024/0362815 A1* 10/2024 Joachim .................... G06T 7/70
2024/0378251 A1* 11/2024 Boyd ...................... G06T 11/60

OTHER PUBLICATIONS

Extended European Search Report dated Oct. 31, 2024, issued in European Application No. 24173299.9.
Taiwanese Office Action dated Apr. 7, 2025 in Application No. 113115768.

* cited by examiner

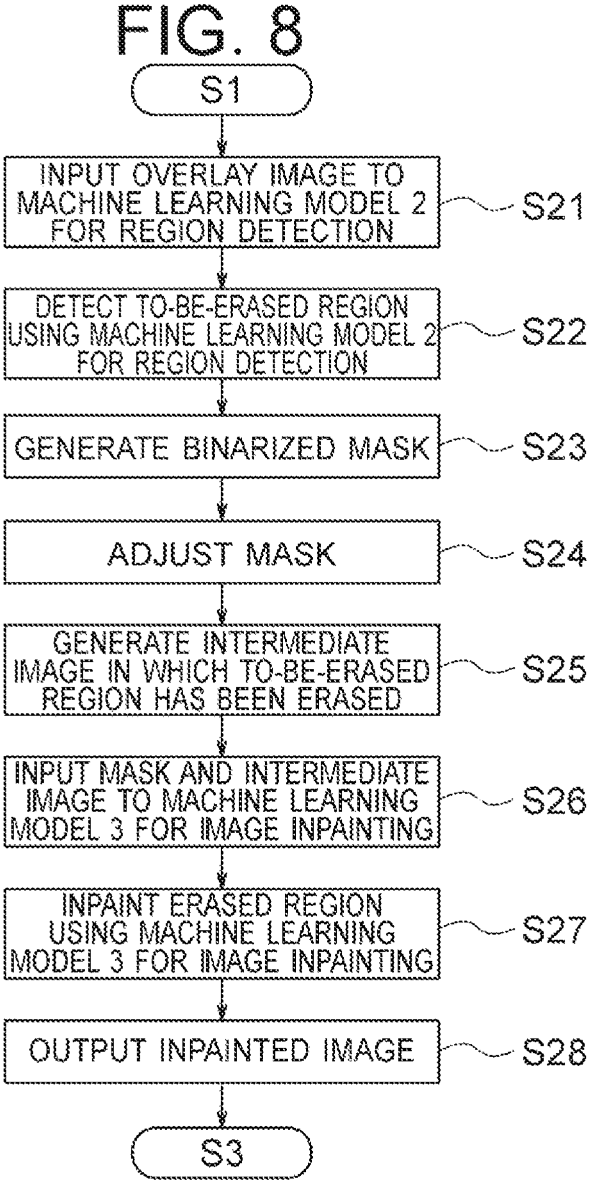

INPUT OVERLAY IMAGE TO
MACHINE LEARNING MODEL 2
FOR REGION DETECTION — S21

DETECT TO-BE-ERASED REGION
USING MACHINE LEARNING MODEL 2
FOR REGION DETECTION — S22

GENERATE BINARIZED MASK — S23

ADJUST MASK — S24

GENERATE INTERMEDIATE
IMAGE IN WHICH TO-BE-ERASED
REGION HAS BEEN ERASED — S25

INPUT MASK AND INTERMEDIATE
IMAGE TO MACHINE LEARNING
MODEL 3 FOR IMAGE INPAINTING — S26

INPAINT ERASED REGION
USING MACHINE LEARNING
MODEL 3 FOR IMAGE INPAINTING — S27

OUTPUT INPAINTED IMAGE — S28

S3

INFORMATION PROCESSING APPARATUS AND INFORMATION PROCESSING METHOD FOR PROCESSING OVERLAY IMAGES

TECHNICAL FIELD

The present invention relates to an information processing apparatus and an information processing method, and more particularly, to a technique for allowing images overlaid with additional information, such as text, logos, to be reusable.

BACKGROUND ART

Most of Electronic Commerce (EC) platforms rely heavily on a large number of images to visualize the products and services they offer to users. How attractively a product or service is presented to users through images is a major determinant of EC site sales.

In many cases, images of products and services provided by those EC sites are overlaid with, as digitalized elements, additional information such as product names and logos, brand names and logos, advertising captions, descriptions of products and services, pricing information, promotion information, or the like, as information to encourage users to purchase such products and services. By allowing a user to view the overlaid additional information along with the image of the product or service displayed on the EC site at the same time, it makes it possible to correctly provide the necessary information for purchasing the product or service to the user concerned.

Meanwhile, in order to reuse an image overlaid with those additional information (hereinafter also referred to as "overlay image"), it is often required to erase the overlaid additional information. The purposes of reusing overlay images are manifold, but include, for example, image editing to images of products with different colors or designs, and replacement with different additional information (e.g., different captions, different descriptions or prices, different promotions). Erasing additional information from overlay images also helps to improve the accuracy in classifying images of products and the like.

Furthermore, in an image from which the additional information has been erased, pixels in a region where the additional information has been erased are lost. Therefore, such image needs to be restored to the original image before it was overlaid with such additional information by inpainting the image in the region where pixels are lost.

Patent Literature 1 discloses a computer-implemented method of replacing an object in an image.

More specifically, the computer-implemented method disclosed in Patent Literature 1 identifies a first object, which is a target object to be replaced at a certain position in a first image, masks an area of the target object based on the first image and the position of the first object, and generates a mask image.

The computer-implemented method disclosed in Patent Literature 1 further generates, based on the generated mask image and a machine learning model for image inpainting, a second image, which is an image that does not contain the target object and in which a portion of the target object has been inpainted, generates a third image from the mask image and the second image, and adds a new object, which is different from the first object, to the generated third image.

LISTING OF REFERENCES

Patent Literature

PATENT LITERATURE 1: Laid-open Publication of Japanese Patent Application No. 2023-500203 A

SUMMARY OF THE INVENTION

Problems to be Solved by the Invention

Using the technique of the Patent Literature 1, it is possible to detect a text label overlaid on an image, video, or the like, and replace the text label with a new label that is different from the text label, for example, text translated into a different language.

However, it is not technically easy to detect and erase only the additional information that needs to be erased from the overlay image.

In particular, because EC sites need to display a large number of product images in a comparable manner within a single Web page, the display size that can be allocated to a single product image is necessarily limited to a smaller size. For this reason, in many cases, additional information is overlaid on the product object in the image. This makes it difficult to accurately erase only the additional information and is likely to reduce the accuracy of image inpainting.

Furthermore, it is also not technically easy to accurately distinguish between overlaid additional information in an image and information displayed on objects or background in the image that should not be erased.

For example, when a product object in a certain image is a product package that contains text information such as the product name, there is a risk that the product name or other information on the package would be erroneously erased. On the other hand, when the additional information is a logo image other than text, or when the text of the additional information is superimposed on a frame image having, for example, a circle or ribbon shape, there is a risk that the additional information would remain without being erased correctly.

The present invention has been made in order to solve the above mentioned problems and an object thereof is to provide an information processing apparatus and an information processing method that are capable of allowing an image overlaid with additional information to be reusable by erasing the additional information from the image overlaid with the additional information more appropriately with higher accuracy.

Solution to Problems

In order to solve the above mentioned problems, according to one aspect of the present invention, there is provided an information processing apparatus, comprising: a region detection unit configured to input a first image containing an object and additional information to a first machine learning model and cause the first machine learning model to detect a region of the additional information; a mask generation unit configured to generate a mask to be applied to the region of the additional information from information of the region of the additional information detected by the region detection unit; and an image output unit configured to input the mask generated by the mask generation unit and the first image to a second machine learning model and cause the second machine learning mode to output a second image that is different from the first image, the second image being an image in which the additional information is erased from the first image and a region in the first image from which the additional information has been erased is inpainted.

According to another aspect of the present invention, there is provided an information processing method executed by an information processing apparatus, comprising steps of: inputting a first image containing an object and additional information to a first machine learning model and causing the first machine learning model to detect a region of the additional information; generating a mask to be applied to the region of the additional information from information of the detected region of the additional information; and inputting the generated mask and the first image to a second machine learning model and causing the second machine learning mode to output a second image that is different from the first image, the second image being an image in which the additional information is erased from the first image and a region in the first image from which the additional information has been erased is inpainted.

According to yet another aspect of the present invention, there is provided an information processing program product for causing a computer to execute information processing, the program product causing the computer to execute processing comprising: a region detection process for inputting a first image containing an object and additional information to a first machine learning model and causing the first machine learning model to detect a region of the additional information; a mask generation process for generating a mask to be applied to the region of the additional information from information of the region of the additional information detected by the region detection process; and an image output process for inputting the mask generated by the mask generation process and the first image to a second machine learning model and causing the second machine learning mode to output a second image that is different from the first image, the second image being an image in which the additional information is erased from the first image and a region in the first image from which the additional information has been erased is inpainted.

Advantageous Effect of the Invention

According to the present invention, it makes it possible to allow an image overlaid with additional information to be reusable by erasing the additional information from the image overlaid with the additional information more appropriately with higher accuracy.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 8 is a flowchart illustrating an exemplary detailed processing procedure of the image cleaning processing in step S2 in FIG. 5, which is performed by the overlay image processing apparatus according to the present embodiment.

DESCRIPTION OF EMBODIMENTS

Figure 1:
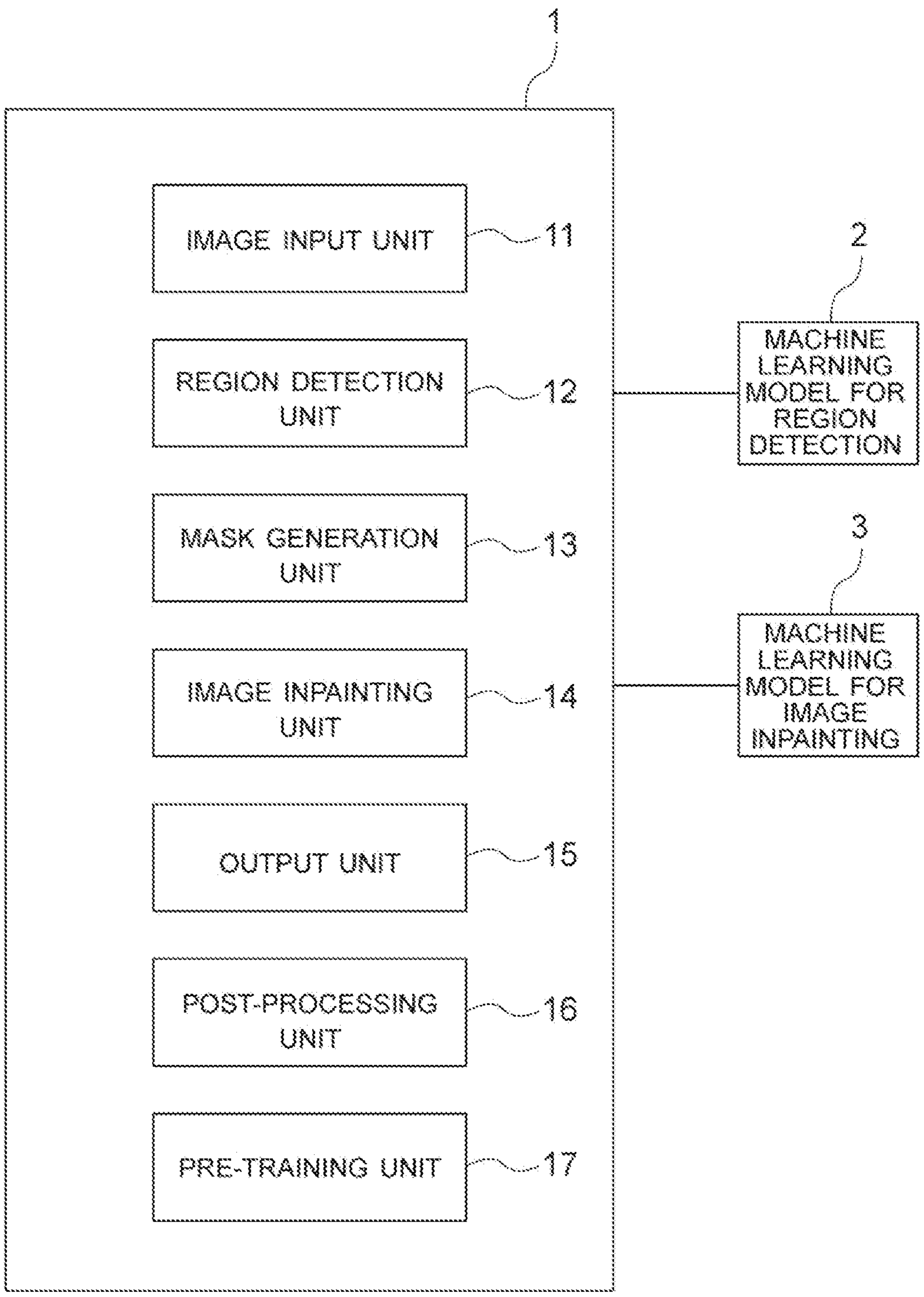
FIG. 1 is a block diagram illustrating an exemplary functional configuration of an overlay image processing system according to respective embodiments of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

An overlay image processing apparatus according to the present embodiment inputs a first image in which additional information is overlaid on an image containing an object to a first machine learning model, causes the first machine learning model to detect a region of the additional information in the first image, and generates a mask to be applied to the detected region of the additional information.

The overlay image processor further inputs the first image and the generated mask to a second machine learning model, and causes the second machine learning model to output a second image in which the additional information is erased from the first image and a region from which the additional information has been erased is inpainted (restored).

Hereinafter, a certain non-limiting example will be described in which the overlay image processing apparatus according to the present embodiment processes, as an input image, an image that contains an image showing a product or a service on an EC site or the like as a primary object (hereinafter also referred to as "primary object"). The input image is also assumed to be overlaid with, as digitalized elements on the same image, additional information such as a product name or a product logo, a brand name or a brand logo, advertising captions, descriptions of the product or service, pricing information, promotion information, and the like, as information to encourage users to purchase the product or service concerned.

However, the present embodiment is not limited thereto, and the input image to be processed by the overlay image processing apparatus may be any image containing any object, such as text, graphics, images, or the like, or a background-only image, and the additional information to be overlaid on the image may contain any digitalized element in any form of text, graphics, images, and the like, and may or may not be associated with the primacy object contained in the same image.

Also hereinafter, a certain example will be described in which the overlay image processing apparatus erases additional information overlaid on the input image as a digitalized element from the input image, inpaints an image of the region from which the additional information has been erased and outputs the inpainted image. However, the present embodiment is not limited thereto, and the overlay image processing apparatus may perform either of erasure processing of the additional information or inpainting processing of images.

Hereafter, an image in which additional information is overlaid on an image containing an object, which is to be input to the overlay image processing apparatus, is referred to as an overlay image. The additional information overlaid on an image is also referred to as a digital overlay. On the other hand, the image before being overlaid with the additional information is referred to as an original image.

<Functional Configuration of Overlay Image Processing Apparatus>

FIG. 1 is a block diagram illustrating an exemplary functional configuration of the overlay image processing system according to the present embodiment. The overlay image processing system illustrated in FIG. 1 includes an overly image processing apparatus 1, a machine leaning model 2 for region detection, and a machine leaning model 3 for image inpainting.

The overlay image processing apparatus 1 includes in image input unit 11, a region detection unit 12, a mask generation unit 13, an image inpainting unit 14, an output unit 15, and a post-processing unit 15. The overlay image processing apparatus 1 may further include a pre-training unit 17. Alternatively, the pre-training unit 17 may be provided in any of other computing components other than the overlay image processing apparatus 1.

The overlay image processing apparatus 1 may be communicatively connected to a client device constituted with a Personal Computer (PC), or the like (not shown) via a network. In this case, the overlay image processing apparatus 1 may be implemented in a server, and the client device may provide a user interface for the overlay image processing apparatus 1 to perform input/output of information to/from the outside and may also be equipped with some or all of the respective components 11 to 17.

The image input unit 11 acquires an overlay image stored in a storage device as an input image and supplies the acquired overlay image to the region detection unit 12 and the image inpainting unit 14, respectively.

The storage device that stores the overlay image may be constituted with a non-volatile storage device such as a Hard Disk Drive (HDD), a Solid State Drive (SSD), or the like.

The image input unit 11 may acquire the overlay image by reading the overlay image stored in advance in such a storage device, or alternatively, the image input unit 11 may receive the overlay image via the communication I/F from the same or different counterpart device that stores the overlay image. Yet alternatively, the image input unit 11 may acquire the overlay image in real time using web crawling or other methods via the communication I/F.

The image input unit 11 also accepts input of various parameters necessary to perform the overlay image processing performed by the overlay image processing apparatus 1. The image input unit 11 may accept input of various parameters via a user interface of a client device that is communicatively connected to the overlay image processing apparatus 1.

The region detection unit 12 detects a region of a digital overlay, which is the additional information to be erased, in the overlay image supplied from the image input unit 11, and supplies the detection result of the region to be erased in the overlay image to the mask generation unit 13.

More specifically, the region detection unit 12 inputs the overlay image, which is the input image, to the machine learning model 2 for region detection, causes the machine learning model 2 for region detection to detect a region of the additional information overlaid on the overlay image, and places a bounding box around the detected region.

According to the present embodiment, the additional information to be erased is information that is added to an object of a product or the like, such as product names and logos, brand names and logos, advertising captions, descriptions of products and services, pricing information, promotion information, and other information, and may include text, graphics, and images. The additional information (i.e., digital overlay) to be erased may include digital text that varies in language, font, size, color, and textual effect. The additional information to be erased may also include color frames, logos, ribbons, badges, and other decorative elements around the text.

According to the present embodiment, the region detection unit 12 may detect not only a region of textual additional information, but also a region of graphical or image additional information as a region to be erased.

The machine learning model 2 for region detection is a machine learning model that is capable of detecting a position, type, and number of a given object from an input image. According to the present embodiment, the machine learning model 2 for region detection may be implemented in a network or an algorithm suitable for object detection, such as YOLO (You Only Look Once), and may be pre-trained using a pre-prepared training data set. The details of this pre-training for the machine learning model 2 for region detection will be described below with reference to FIG. 6.

The mask generation unit 13 generates a mask for masking the region of the additional information (i.e., digital overlay) detected in the overlay image, based on the region detection result of the overlay image supplied from the region detection unit 12, in other words, the region detection result of the region of the additional information (i.e., digital overlay) detected in the overlay image, and supplies the generated mask to the image inpainting unit 14.

More specifically, the mask generation unit 13 generates a binarized mask in which the value of pixels in the region of the additional information detected in the overlay image, in other words, the region of the digital overlay to be erased from the overlay image, is set to 1, and the value of pixels in other regions of the overlay image other than the region of the additional information detected in the overlay image is set to 0.

According to the present embodiment, the mask generation unit 13 has a function to adjust the shape and size of the mask generated corresponding to the rectangular bounding box output by the machine learning model 2 for region detection. This allows for smaller or larger regions to be inpainted in the overlay image, thereby optimizing the target region for image inpainting and improving the accuracy in image inpainting. Details of the mask adjustment processing performed by the mask generation unit 13 will be described below with reference to FIGS. 8 and 9.

The image inpainting unit 14 supplies the output unit 15 with an inpainted image, in which the additional information to be erased from the overlay image is erased from the overlay image and the image of the region from which the additional information has been erased is inpainted (restored), based on the overlay image supplied from the image input unit 11 and the mask supplied from the mask generation unit 13, as the image inpainting result.

More specifically, the image inpainting unit 14 applies a mask to the overlay image, which is the input image, to generate an intermediate image in which the region of the additional information detected from the overlay image has been erased. The image inpainting unit 14 also inputs the generated intermediate image and the mask to the machine learning model 3 for image inpainting, and causes the machine learning model 3 for image inpainting to output the inpainted image in which an image of the region of the additional information erased from the overlay image is restored to the state before the additional information was overlaid. Alternatively, the image inpainting unit 14 may input the overlay image, which is the input image, and the mask to the machine learning model 3 for image inpainting, and cause the machine learning model 3 for image inpainting to generate the intermediate image in which the region of the additional information have been erased from the overlay image.

The machine learning model 3 for image inpainting is a machine learning model that is capable of inpainting pixels in a given region masked from an input image. According to the present embodiment, the machine learning model 3 for image inpainting may be implemented in a network or an algorithm suitable for image inpainting, such as LaMa (Resolution-robust Large Mask Inpainting with Fourier Convolutions), and may be pre-trained using a pre-prepared training data set. The details of the pre-training of the machine learning model 3 for image inpainting will be described below with reference to FIG. 7.

The output unit 15 outputs the inpainted image supplied from the image inpainting unit 14, in other words, the image in which the region of the additional information is erased from the overlay image and the image in the erased region is inpainted to the state before the additional information was overlaid (i.e., original image).

More specifically, the output unit 15 may supply the inpainted image to the post-processing unit 16, and store the inpainted image in a storage device or display the inpainted image on a display device.

The post-processing unit 16 performs post-processing to arbitrarily process the inpainted image supplied from the output unit 15 or read from the storage device. The post-processing performed by the post-processing unit 16 may include, for example, adjusting the size and the arrangement of the primary object in the inpainted image, details of which will be described below with reference to FIG. 10.

The pre-training unit 17 pre-trains the machine learning model 2 for region detection and the machine learning model 3 for image inpainting, respectively. The machine learning model 2 for region detection and the machine learning model 3 for image inpainting are machine learning models that have different structures from each other and are pre-trained using different training data sets, respectively, the details of which will be described below with reference to FIGS. 6 and 7.

It should be noted, however, that machine learning models that may be used for the overlay image processing according to the present embodiment are not limited to supervised machine learning models, and unsupervised machine learning models using reinforcement learning, for example, may be used.

Referring to FIGS. 2A through 3B, non-limiting concrete examples of the overlay image processing performed by the overlay image processing apparatus 1 according to the present embodiment will be described below.

Figure 2A:
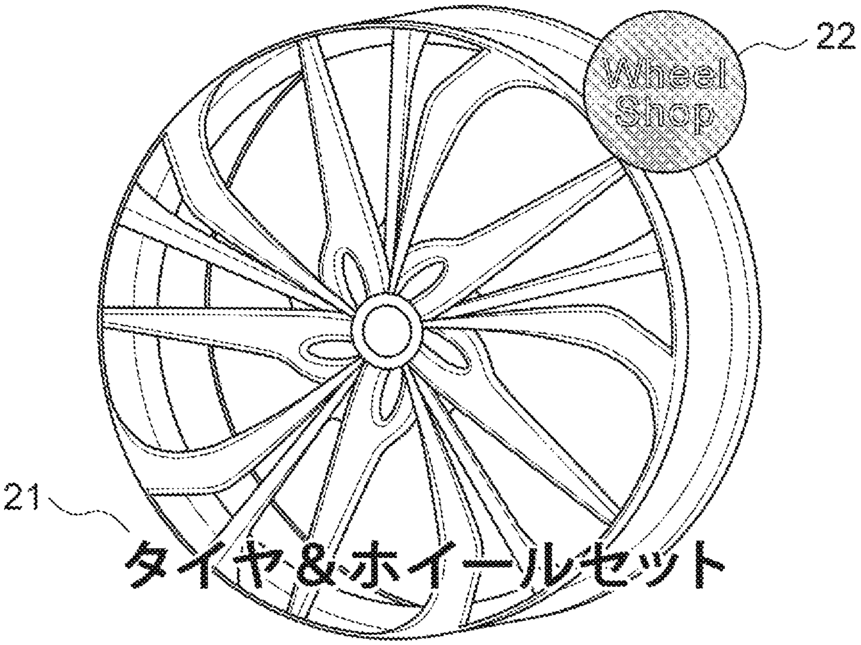
FIG. 2A is a schematic diagram illustrating an example of an overlay image input to an overlay image processing apparatus according to the present embodiment.

FIG. 2A is a schematic diagram illustrating an example of an overlay image input to the overlay image processing apparatus 1. Referring to FIG. 2A, an image of a tire and a wheel is shown in the center of the image, and superimposed on the tire and wheel image is a description identifying the product "Tire & Wheel Set" at the bottom of the image and a brand logo surrounded by a circular colored frame at the upper right of the image, respectively. The product-identifying description and the associated notice located at the bottom of the overlay image is textual additional information 21, and the brand logo located at the upper right of the overlay image is additional information 22 with textual description over the circular frame image.

Figure 2B:
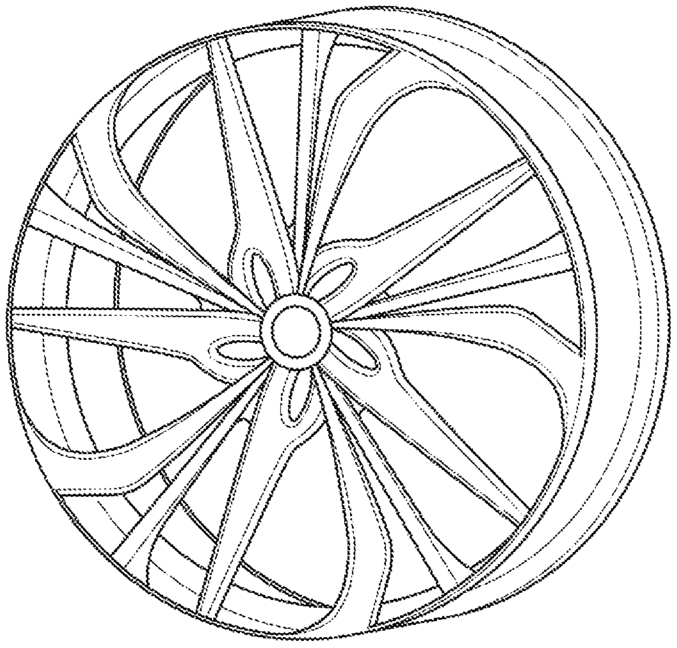
FIG. 2B is a schematic diagram illustrating an example of an image output from the overlay image processing apparatus according to the present embodiment, in which additional information has been erased from the overlay image of FIG. 2A.

FIG. 2B is a schematic diagram illustrating an example of an inpainted image output from the overlay image processing apparatus 1 in which overlay information (i.e., digital overlay) has been erased from the overlay image in FIG. 2A. Referring to FIG. 2B, the additional information of the text at the bottom of the overlay image and the additional information of the image at the upper right of the overlay image are both erased, and images in the regions of the erased additional information are inpainted. For the additional information of the image at the upper right, not only the text portion but also the circular image surrounding the text is erased, and the image in the erased region is inpainted as a partial image of the entire tire and wheel image in the original image.

In this way, according to the present embodiment, it makes it possible to detect not only regions of textual additional information, but also regions of graphical or image additional information as regions to be erased.

Figure 3A:
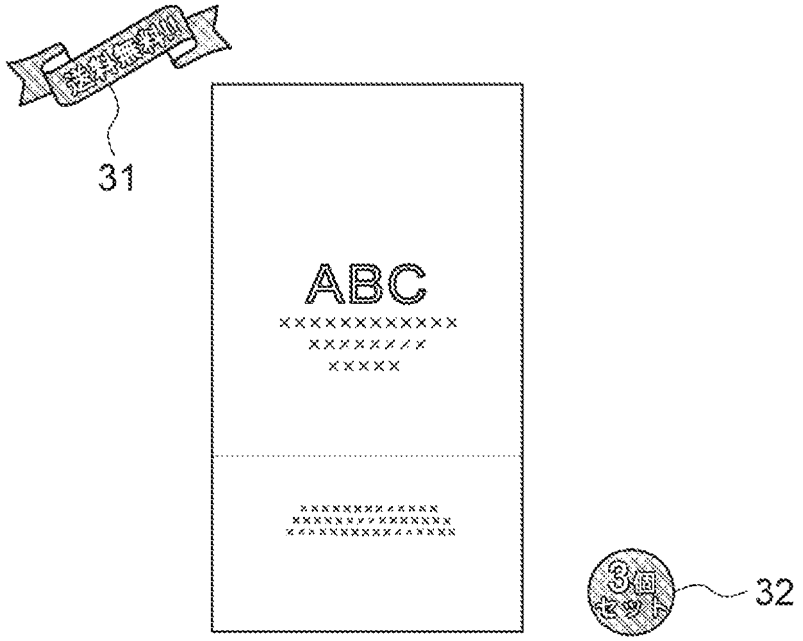
FIG. 3A is a schematic diagram illustrating another example of an overlay image input to the overlay image processing apparatus according to the present embodiment.

FIG. 3A is a schematic diagram illustrating another example of an overlay image input to the overlay image processing apparatus 1. Referring to FIG. 3A, an image of a package of nutritional supplements is shown in the center of the image, and a description on the product sales surrounded by a ribbon-shaped frame, "Free shipping!", is overlaid on the upper left corner of the overlay image, and a description on the sales style of the product surrounded by a circular colored frame, "Set of 3", is overlaid in the lower right corner of the overlay image. The description on product sales surrounded by a ribbon-shaped frame positioned at the upper left of the overlay image and the description on the sales style surrounded by a circular frame positioned at the lower right of the overlay image are both the additional information 31 and 32, respectively, in which text is described in the frame image.

Figure 3B:
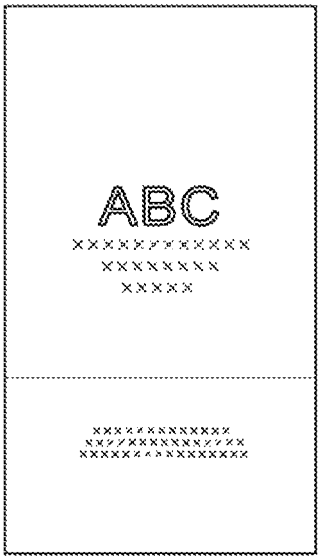
FIG. 3B is a schematic diagram illustrating another example of an image output from the overlay image processing apparatus according to the present embodiment, in which additional information has been erased from the overlay image in FIG. 3A.

FIG. 3B is a schematic diagram illustrating an example of an image output from overlay image processing unit 1 in which overlay information (i.e., digital overlay) has been erased from the overlay image in FIG. 3A. Referring to FIG. 3B, both the upper left and lower right additional information in the overlay image have been erased, respectively, and the images in the regions of the erased additional information have been inpainted. In both regions, not only the text portions of the additional information but also the ribbon-shaped and circular image portions surrounding the text are erased, and the images of the erased regions are inpainted as partial images of the background image of the product package, which is the primary object. On the other hand, the product name "ABC" and other text described on the product package are not erased from the overlay image because they are not overlaid additional information but elements that constitute a part of the original product image.

In this way, according to the present embodiment, while appropriately erasing the text overlaid as the additional information, it makes it possible to retain the text that was not overlaid as the additional information but constitutes the object or the background of the original image before being overlaid in the original image without being erased.

<Exemplary Network Configuration of Machine Learning Model for Region Detection and Machine Leaning Model for Image Inpainting>

Figure 4:
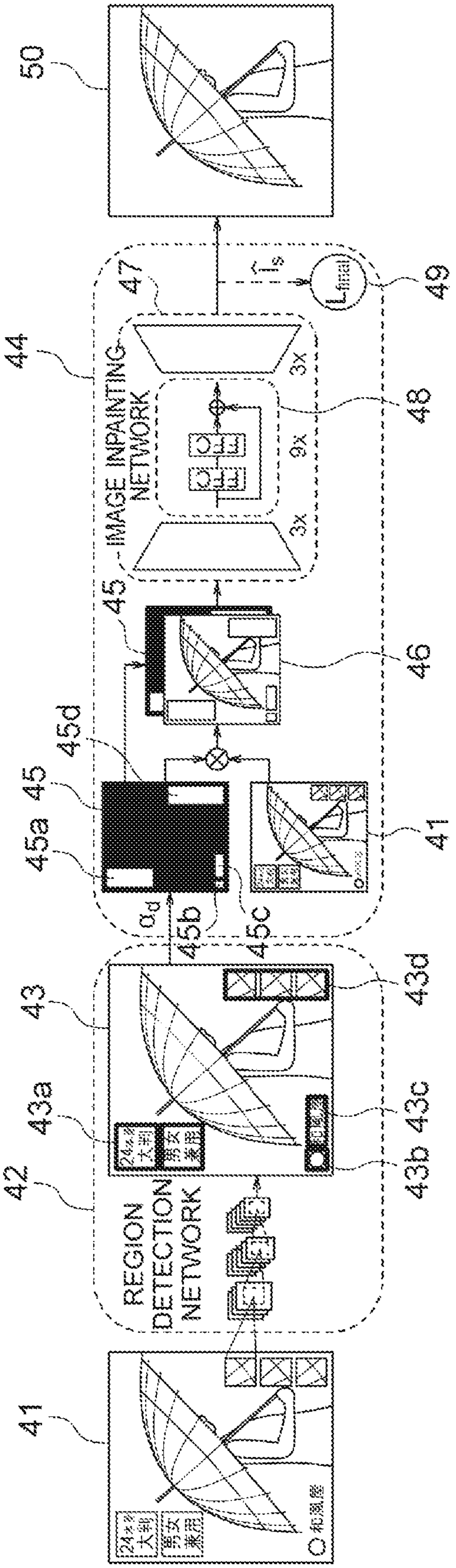
FIG. 4 is a conceptual diagram illustrating an exemplary network configuration when the overlay image processing apparatus according to the present embodiment is implemented in a network for region detection and a network for image inpainting.

FIG. 4 is a conceptual diagram illustrating an exemplary network configuration and outline processing procedure thereof when the machine leaning model 2 for region detection and the machine leaning model 3 for image inpainting according to the present embodiment are implemented in machine learning neural networks.

The network shown in FIG. 4 is constituted with a pipeline of a network for region detection and a network for image inpainting at the subsequent stage, which is configured separately from the network for region detection.

Referring to FIG. 4, an input image 41 is an overlay image in which the additional information on the product is overlaid on an object image showing the product. The overlay image 41 is synthetized by overlaying the textual and image additional information describing the product on an original image obtained by capturing a person carrying the product, an umbrella, with a camera or other imaging device, as the post-processing of generating the original image.

Here, one composite image generated by combining two image layers, the original image and a digital overlay of additional information, is represented by the following equation 1 using alpha compositing. $I_{comp}$ denotes the color value at each pixel location.

$$I_{comp} = \alpha_d I_d + (1 - \alpha_d) I_s \quad \text{(Equation 1)}$$

Where $I_d$ denotes the layer of the digital overlay, $I_s$ denotes the scene, i.e., the layer of the original image before being overlaid, and $\alpha_d$ denotes the alpha channel of the layer of the digital overlay. The alpha channel is an auxiliary data channel used to set the transparency of pixels as part of the color information of the image data. The alpha value generally represents opacity with the minimum value being completely transparent and the maximum value being completely opaque, and is often expressed as an 8-bit 256-step value from 0 to 255. In this case, pixel regions with positive alpha values are detected as the digital overlay in the input image.

The region detection network 42 corresponds to the machine learning model 2 for region detection shown in FIG. 1. When the region detection network 42 is configured based on YOLOv5, or the like, the YOLOv5 neural network resizes the overlay image, which is the input image, divides the resized image into finer grid cells, and regressively detects objects by convolution operations based on grid cell features. Resultantly, the YOLOv5 neural network outputs the coordinates of bounding boxes surrounding the predicted objects and the classes of the predicted objects along with the confidence scores of the prediction.

According to the present embodiment, the region detection network 42 detects the additional information overlaid on the overlay image as a region to be erased. Referring to an image 43 of the region detection result output from the region detection network 42, the region detection network 42 detects the image additional information 43*a*, which describes text describing the product in a rectangular colored frame, the image additional information 43*b*, which describes the brand logo of the seller of the product, the textual additional information 43*c*, which describes text describing the seller of the product, and image additional information 43*d*, which describes the color variation of the product, respectively.

The image 43 of the region detection result is input to the network 44 at the subsequent stage. The network 44 includes a component at the former stage that generates a mask and erases the region to be erased with the mask, and an image inpainting network 47 at the subsequent stage.

More specifically, the image 43 of the region detection result and the overlay image, which is the input image, are input to the mask generation unit 13 of the overlay image processing apparatus 1, the mask generation unit 13 predicts the mask 45 to be applied to the overlay image, which is the input image, and inputs the predicted mask 45 to the image inpainting network 47 at the subsequent stage. Referring to the mask 45 shown in FIG. 4, the value 1 is set to the regions corresponding to the regions 43*a* to 43*d* of the additional information (i.e., digital overlay) detected by the region detection network 42, respectively, to function as the mask regions 45*a* to 45*d* corresponding to those detected regions. On the other hand, the value 0 is set to the regions of the original image where no additional information is detected.

At the former stage of the network 44, the region of the additional information (i.e., digital overlay) is erased from the overlay image, which is the input image, by applying the mask 45 to the overlay image, which is the input image, in other words, by computing with the mask 45. This produces an image 46 in which the region of the additional information (i.e., digital overlay) is erased from the overlay image, which is the input image.

The image 46, from which the region of the additional information (i.e., digital overlay) has been erased, is input to the image inpainting network 47 along with the mask 45.

The image inpainting network 47 corresponds to the machine learning model 3 for image inpainting shown in FIG. 1. Alternatively, the network 44 may be constituted with the machine learning model 3 for image inpainting, and the components of mask generation and additional information region erasure may be incorporated as part of the machine learning model 3 for image inpainting.

When the network 44 including the image inpainting network 47 is configured based on LaMa, or the like, the LaMa image inpainting network 47 may constitute the residual blocks with a Fast Fourier Convolutions (FFCs) network 48, and include the loss function $L_{final}$ 49. The LaMa image inpainting network 47 inpaints the image of the masked region using relatively global features, and outputs an inpainted image 50 in which the region of the additional information is erased from the overlay image, which is the input image, and the erased region is restored to the original image before being overlaid.

The image inpainting network 47 is trained using the loss function $L_{final}$ 49 to be optimized such that the loss between the predicted value $\hat{I}_s$ of the inpainted image and the correct data of the original image $I_s$ before being overlaid is smaller during pre-training and re-training.

The details of the loss function $L_{final}$ 49 will be described below with reference to FIG. 7.

<Overlay Image Processing Performed by Overlay Image Processing Apparatus 1>

Figure 5:
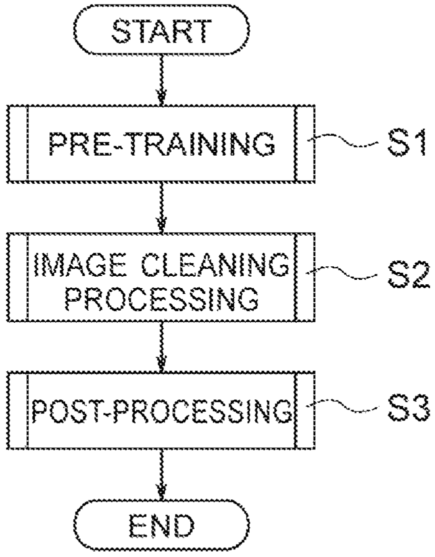
FIG. 5 is a flowchart illustrating an exemplary outline processing procedure of the overlay image processing performed by the overlay image processing apparatus according to the present embodiment.

FIG. 5 is a flowchart illustrating an exemplary outline processing procedure of the overlay image processing performed by the overlay image processing apparatus 1 according to the present embodiment.

It should be noted that each step shown in FIG. 5 may be performed by the CPU reading and executing a program stored in the storage device such as an HDD of the overlay image processing apparatus 1. Alternatively, at least a part of the flowchart shown in FIG. 5 may be carried out by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the pre-training unit 17 of the overlay image processing apparatus 1 pre-trains the machine learning model 2 for region detection and the machine learning model 3 for image inpainting using their respective training data sets. The details of the pre-training processing will be described below with reference to FIGS. 6 and 7.

In step S2, the image input unit 11, the region detection unit 12, the mask generation unit 13, and the image inpainting unit 14 of the overlay image processing apparatus 1 perform the image cleaning processing. The image cleaning processing is processing that erases the additional information (i.e., digital overlay) in the overlay image, which is the input image, and inpaints the image in the region from which the additional information has been erased. The details of the image cleaning processing will be described below with reference to FIG. 8. The image cleaning processing performed in step S2 corresponds to the inference phase for predicting the inpainted image using the pre-trained machine learning model 2 for region detection and the pre-trained machine learning model 3 for image inpainting.

In step S3, the post-processing unit 16 of the overlay image processing apparatus 1 performs the post-processing of the image cleaning processing in step S2, i.e., erasure of regions of the additional information and image inpainting. The post-processing performed by the post-processing unit 16 may include, for example, adjusting the inpainted image output by the image cleaning processing, the details of which will be described below with reference to FIG. 10.

<Pre-Training of Machine Learning Model 2 for Region Detection>

Figure 6:
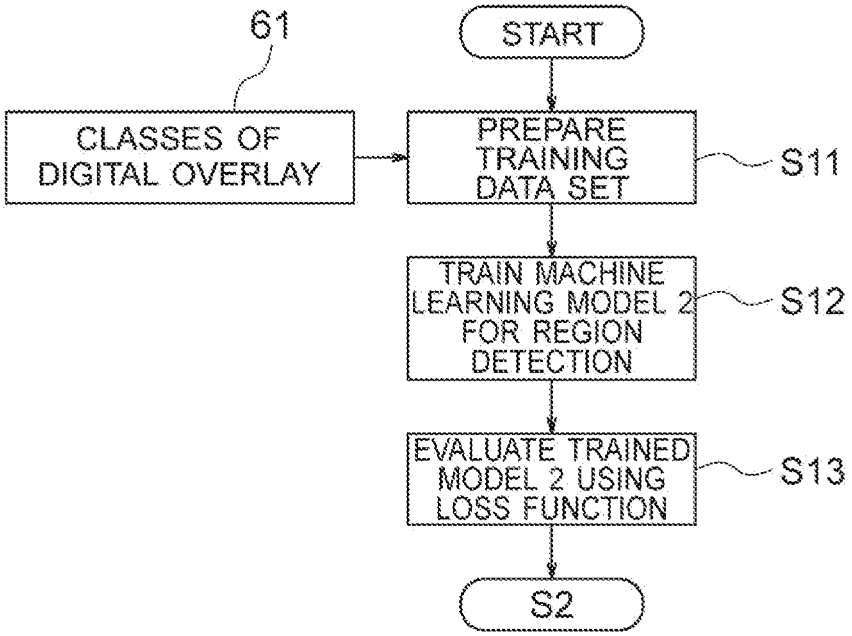
FIG. 6 is a flowchart illustrating an exemplary detailed processing procedure of the pre-training processing in step S1 in FIG. 5, which is performed on a machine learning model 2 for region detection by the overlay image processing apparatus according to the present embodiment.

FIG. 6 is a flowchart illustrating an exemplary detailed processing procedure of the pre-training processing for the machine learning model 2 for region detection in step S1 in FIG. 5, which is performed by the overlay image processing apparatus 1.

In step S11, the pre-training unit 17 prepares a training data set for pre-training the machine learning model 2 for region detection and stores the training data set in a storage device.

More specifically, the pre-training unit 17 prepares a number of overlay images in each of which the additional information of the object, such as a product, is overlaid on the image containing the object. In each of those overlay images, bounding boxes are pre-annotated for regions of additional information to be erased, respectively.

According to the present embodiment, the pre-training unit 17 labels each of the regions of the additional information to be detected with a class of such additional information (i.e., digital overlay). The class may include the text of the additional information, the shape of a region of the additional information, the color combination (i.e., color palette) of the region of additional information and the text, and the corner. The class of corner is a class for classifying whether or not the region of the additional information is positioned at a corner of the overlay image, in other words, the class of corner indicates the relative position of the region of the additional information to the periphery of the overlay image. In many cases, the additional information is positioned at the corners of the image under the restriction of limited display size. Therefore, by setting the classes of corners, it makes it possible to improve the detection accuracy of the regions of the additional information and to refine the shape and size of the mask corresponding to the detected region.

As described above, according to the present embodiment, for training data for pre-training the machine learning model 2 for region detection, not only the regions of the additional information in the overlay image are annotated as bounding boxes, but also a class and its value (i.e., attribute value) are labeled for each of regions of the additional information. In other words, the correct answer data for each overlay image includes the bounding boxes, the classes and respective values, which are annotated to regions of the additional information, respectively.

In addition to text, as a class to be labeled to the region of the additional information, the region of the additional information may be labeled with shape (including the presence or absence of a frame surrounding the text), color (including color combinations), and corner (including the relative positional relationship between the original image and the region of the additional information), as correct answer data. This avoids the cases where only the text of the additional information is detected and the frames surrounding the text remain undetected, or where text that is not additional information, i.e., text that exists in the original image before being overlaid, is erroneously detected.

In step S12, the pre-training unit 17 trains the machine learning model 2 for region detection using the training dataset prepared in step S11 as input.

In step S13, the pre-training unit 17 evaluates the machine learning model 2 for region detection trained in step S12 using a predetermined loss function.

More specifically, the pre-training unit 17 trains the machine learning model 2 for region detection such that the difference between the predicted region of the additional information, which is output by the machine learning model 2 for region detection pre-trained in step S12, and the corresponding correct answer data becomes smaller. The predetermined loss function may be, for example, the binary cross entropy loss function, but is not limited thereto.

The pre-training unit 17 may repeat the processing in step S12 and step S13 until the loss output by the loss function converges to the desired threshold value in step S13.

After the processing in step S13 is completed, the overlay image processing proceeds to step S2 shown in FIG. 5.

<Pre-Training of Machine Learning Model 3 for Image Inpainting>

Figure 7:
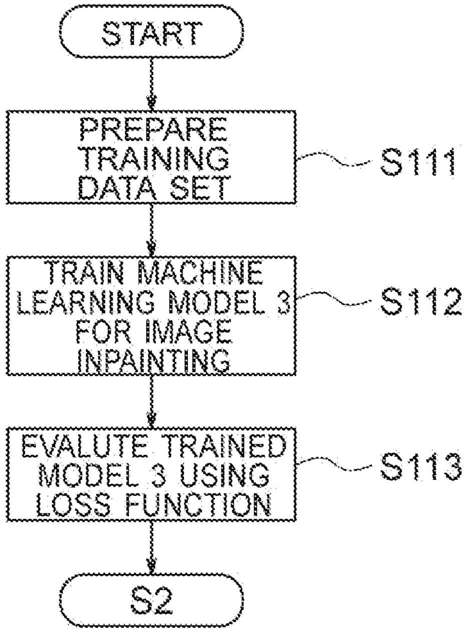
FIG. 7 is a flowchart illustrating an exemplary detailed processing procedure of the pre-training processing in step S1 in FIG. 5, which is performed on a machine learning model 3 for image inpainting by the overlay image processing apparatus according to the present embodiment.

FIG. 7 is a flowchart illustrating an exemplary detailed processing procedure of the pre-training processing for the machine learning model 3 for image inpainting in step S1 in FIG. 5, which is performed by the overlay image processing apparatus 1.

In step S111, the pre-training unit 17 prepares a training data set for pre-training the machine learning model 3 for image inpainting and stores the training data set in a storage device.

More specifically, the pre-training unit 17 prepares a number of overlay images and corresponding masks. Each of the overlay images contains an image of an object, such as a product, and the additional information of the object overlaid on the object image. Each of the masks is generated corresponding to each of the regions of the additional information in the overlay image. Furthermore, the pre-training unit 17 prepares the original image that contains only an object such as a product before the additional information is overlaid for each overlay image as the correct answer data (i.e., ground truth) in image inpainting, and stores those overlay images, masks, and correct answer data in the training data set. Alternatively, the pre-training unit 17 may store, in place of the masks, the images in which the additional regions to be erased from the overlay images have been erased in the training data set, and train the machine learning model 3 for image inpainting with such training data set.

In step S112, the pre-training unit 17 trains the machine learning model 3 for image inpainting using the training data set prepared in step S111 as input.

In step S113, the pre-training unit 17 evaluates the machine learning model 3 for image inpainting trained in step S112 using a predetermined loss function.

More specifically, the pre-training unit 17 trains the machine learning model 3 for image inpainting such that the difference between the predicted inpainted image, which is output by the machine learning mode 3 for image inpainting pre-trained in step S112, and the corresponding correct answer data becomes smaller.

The predetermined loss function used in step S113 may be, for example, but not limited to, the loss function expressed in Equation 2 below.

$$L_{final} = \kappa L_{adv} + \alpha L_{pglobal} + \beta L_{plocal} + \gamma R_1 \quad \text{(Equation 2)}$$

Where $L_{adv}$ denotes the adversarial loss, $L_{pglobal}$ denotes the loss in global consistency of the perceptual loss, $L_{plocal}$ denotes the loss in local consistency of the perceptual loss, $R_1$ denotes the gradient penalty. Those perceptual losses evaluate the distance between the feature vectors of the inpainted image, which are predicted by the machine learning model 3 for image inpainting, and the original image, respectively.

The pre-training unit 17 may repeat the processing of step S112 and step S113 until the loss output by the loss function converges to the desired threshold value in step S113.

<Image Cleaning Processing>

FIG. 8 is a flowchart showing an exemplary detailed processing procedure of the image cleaning processing in step S2 in FIG. 5, which is performed by the overlay image processing apparatus 1. The overlay information cleaning processing is the processing that predicts the original image before being overlaid from the overlay image using two machine learning models that have already been trained, i.e., the machine learning model 2 for region detection and the machine learning model 3 for image inpainting.

In step S21, the region detection unit 12 of the overlay image processing apparatus 1 inputs an overlay image in which the additional information is overlaid on the image containing the primary object as an input image to the machine learning model 2 for region detection.

In step S22, the machine learning model 2 for region detection detects regions of the additional information in the overlay image and outputs the detection results of regions of the additional information as predicted regions to be erased. The detection results of the regions of the additional information each include the four coordinate values of each of the bounding boxes surrounding the detected regions of the additional information and a confidence score assigned to each of the bounding boxes. The confidence score indicates the probability that the bounding box contains the object to be detected (according to the present embodiment, the region of the additional information).

The machine learning model 2 for region detection learns the parameters of text, color, shape, and corner (including the relative position of the region of the additional information to the overlay image, especially whether the region of the additional information is positioned at a corner of the overlay image), as multiple classes of the additional information. The machine learning model 2 for region detection may be equipped with an output channel that outputs the classes of the additional information predicted for the input overlay image.

When implementing the machine learning model 2 for region detection in YOLOv5 or other network or algorism, the machine learning model 2 for region detection divides the overlay image, which is the input image, into S*S grid cells, and then calculates the confidence score of the bounding box that each of divided grid cells has. The machine learning model 2 for region detection uses NMS (Non-Maximum Suppression) to suppress regions with larger IoU (Intersection over Union) values, i.e., regions with a higher degree of overlap, with a threshold value. Thus, the machine leaning model 2 for region detection selects the bounding boxes with higher confidence scores as the prediction results, and output the coordinates of each of the selected bounding boxes and the class of the predicted object along with the confidence score.

According to the present embodiment, the region detection unit 12 may perform region detection of the additional information using the prediction results of the classes of the additional information output from the output channel of the machine learning model 2 for region detection. Alternatively, the region detection unit 12 may optimize the size, shape, and arrangement of regions of the additional information in the overlay image using the prediction results of the classes of the additional information in the input overlay image, and may perform weighting based on the classes in region detection. The classes of the additional information may include text, shape (including the presence or absence of a frame surrounding the text), color (including color combinations), and corner (including the relative positional relationship between the original image and the region of the additional information).

In step S23, the mask generation unit 13 of the overlay image processing unit 1 generates a binarized mask to mask the region of the additional information detected in the overlay image in step S22.

More specifically, mask generation unit 13 generates a mask (e.g., mask 45 in FIG. 4) in which a value 1 is set to the region of the additional information detected in the overlay image and value 0 is set to the remaining regions in the overlay image other than the region of the additional information (i.e., regions of the primary object and the background). By applying the generated mask to the overlay image, an intermediate image (e.g., image 46 in FIG. 4) may be obtained from the overlay image in which the regions of detected additional information are erased.

In step S24, the mask generation unit 13 of the overlay image processing apparatus 1 adjusts the size, shape, or arrangement of the mask generated in step S23.

More specifically, the mask generation unit 13 may optimize the mask generated in step S23 by referring to the class of the additional information output from the output channel of the machine learning model 2 for region detection.

The mask generated in step S23 has a shape that substantially coincides with the bounding box surrounding the region of the additional information detected in step S22, thus it is typically assumed to be rectangular in shape. According to the present embodiment, the shape, size, and arrangement of the rectangular mask is adjusted based on the class of the additional information.

The mask generation unit 13 may, for example, change the shape of the mask, which was once generated in a rectangular shape in step S22, such that the shape of the mask coincides with the shape indicated by the class of the additional information concerned. For example, when the predicted class of the additional information is a class indicating a circular or elliptical shape, by changing the rectangular mask to a circular or elliptical shape, it makes it possible to reduce the size of the region that is subject to image inpainting so as to improve the accuracy of image inpainting.

Figure 9:
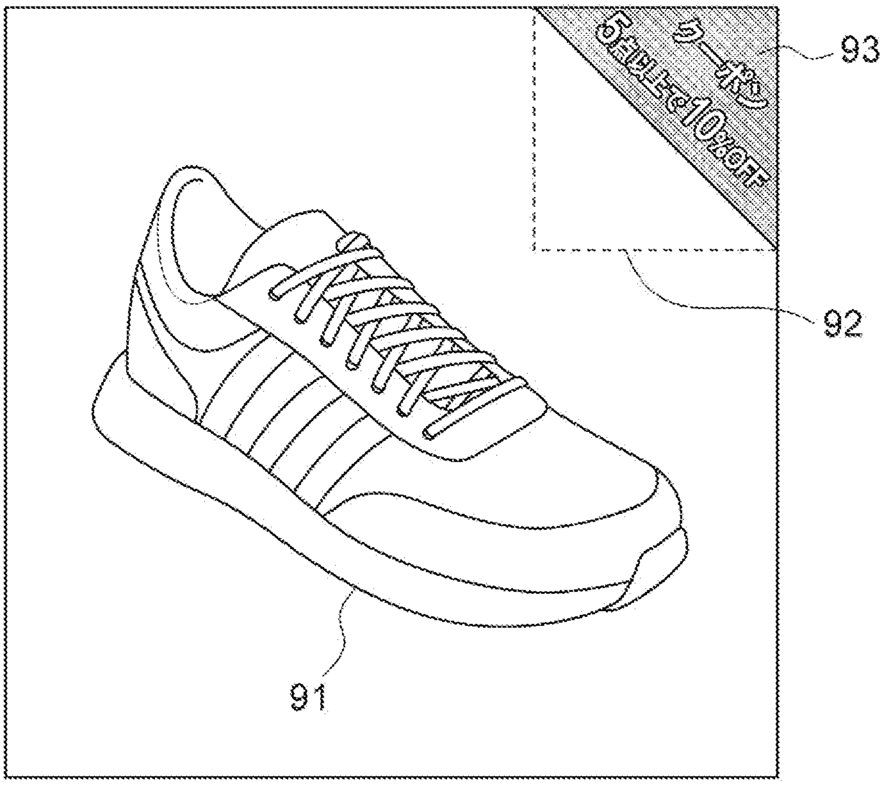
FIG. 9 is a flowchart illustrating an exemplary detailed processing procedure of the mask adjustment processing performed by the mask generation unit of the overlay image processing apparatus according to the present embodiment.

FIG. 9 is a schematic diagram illustrating an example of such mask adjustment processing performed by the mask generation unit 13. Referring to FIG. 9, it is assumed that a rectangular shaped mask 92 is generated in step S23 as a mask to be applied to the region of the additional information. On the other hand, the additional information shown in FIG. 9 is positioned at the upper right corner of the overlay image and describes text on the product object in a triangle-shaped colored frame.

In step S24, the mask generation unit 13 adjusts the rectangular-shaped mask 92 to a triangular-shaped mask 93 that is tangent to the two sides of the corner in the overlay image, for example, based on the class of the additional information, "corner". This avoids excessively erasing regions of the background and objects that are not originally required to be masked and to be subject to image inpainting.

Yet furthermore, according to the present embodiment, the shape, size, arrangement, and the like, of the generated mask may be adjusted based on the relative position of the primary object, such as the product object, and the region of the additional information in the overlay image.

For example, when the rectangular-shaped mask 92 generated in step S23 overlaps the product object in the overlay image, by adjusting the rectangular-shaped mask 92 to a triangle-shaped mask 93 positioned at in the corner, it makes it possible to eliminate image inpainting in the region of the product object 91. This prevents image degradation of the product object after image inpainting.

On the other hand, for example, when the detected region of the additional information is too distant from the product object in the overlay image, the size and shape of the mask may be adjusted such that the mask generated in step S23 is larger. For example, when the color of the product object is color-bleeding to other surrounding objects or background, it makes it possible to include such regions where the color has changed to a different color due to such color-bleeding to the image inpainting target, and inpaint such regions.

Yet furthermore, the boundary of the mask generated in step S23 may be adjusted, for example, by several pixels, based on the color difference between the predicted class (in particular, the color class) for the additional information to which the mask corresponds and the results of a local analysis of the color of the region surrounding the boundary of the mask.

Referring back to FIG. 8, in step S25, the image inpainting unit 14 of the overlay image processing apparatus 1 applies the mask generated in step S23 and adjusted as necessary in step S24 to the overlay image, the input image, to generate an intermediate image in which the region of the additional information to be erased has been erased from the overlay image.

In step S26, the image inpainting unit 14 of the overlay image processing apparatus 1 inputs to the machine learning model 3 for image inpainting the mask, which is generated in step S23 and adjusted as necessary in step S24, and the intermediate image in which the region of the additional information to be erased has been erased from the overlay image.

In step S27, the machine learning model 3 for image inpainting inpaints the image by restoring the regions of erased additional information in the intermediate image to the regions of the original image without the additional information.

When the machine learning model 3 for image inpainting is implemented in LaMa, LaMa-implemented machine learning model inpaints the image of the masked region using relatively global features, and outputs an inpainted image 50 in which the region of the additional information is erased from the overlay image, i.e., the input image, and the erased region is restored to the original image before being overlaid.

In step S28, the output unit 15 of the overlay image processing apparatus 1 outputs the inpainted image output in step S27, and the processing proceeds to step S3 in FIG. 5.

<Post-Processing of Image Cleaning Processing>

Figure 10:
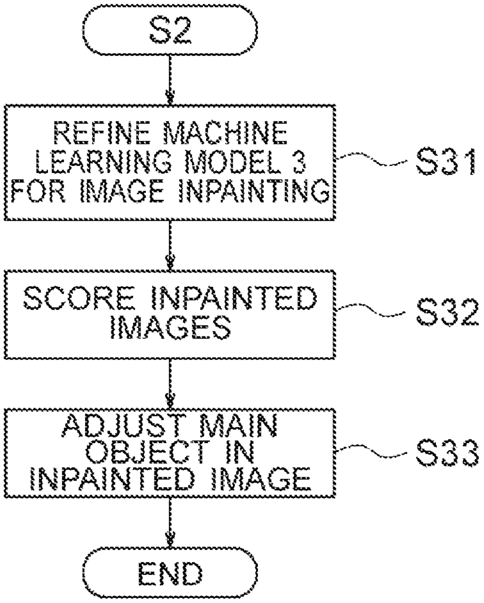
FIG. 10 is a flowchart illustrating an exemplary detailed processing procedure of the post-processing in step S3 in FIG. 5, which is performed by the overlay image processing apparatus according to the present embodiment.

FIG. 10 is a flowchart showing an exemplary detailed processing procedure of the post-processing in step 3 in FIG. 5, which is performed by the overlay image processing apparatus 1.

In step S31, the post-processing unit 16 of the overlay image processing apparatus 1 may refine the machine learning model 3 for image inpainting.

More specifically, the post-processing unit 16 takes as input the inpainted image output in step S28 in FIG. 8, the corresponding mask, and the overlay image, which is input image, and re-trains the machine learning mode 3 for image inpainting using a new loss function $L_{final}$ of which parameters are adjusted to give higher cost (i.e., loss) for visual artifacts such as image blur, for example.

In step S32, the post-processing unit 16 may use the inpainted image output in step S28 in FIG. 8 as input to predict the image quality score of the inpainted image concerned using a network pre-trained with the training data in which higher scores are given to higher quality samples and lower scores to lower quality samples, respectively. In this case, the post-processing unit 16 may remove the inpainted images that fall below a predetermined threshold for the image quality score so that inpainted images with lower image quality are excluded from the final output. This may ensure the image quality of the inpainted images that are finally output externally.

In step S33, the post-processing unit 16 may adjust the primary object in the inpainted image.

More specifically, when the arrangement of the remaining primary object in the inpainted image has become unbalanced due to the erased region of the additional information, the post-processing unit 16 may reposition the primary object in the center of the inpainted image. Furthermore, when the erased region of the additional information is relatively large and the primary object becomes excessively small relative to the background in the inpainted image, the post-processing unit 16 may enlarge and reposition the primary object such that the enlarged primary object has an appropriate margin from the edge of the image.

Although the sequence of processing from step S31 to step S33 may be performed as necessary, by having the post-processing unit 16 perform the sequence of processing from step S31 to step S33, it makes it possible to obtain more accurate and visually natural inpainted images so as to allow the inpainted images to be reusable more effectively.

As described above, according to the present embodiment, the overlay image processing apparatus inputs a first image in which the additional information is overlaid on an image containing an object to a first machine learning model, causes the first machine learning model to detect a region of the additional information in the first image, and generates a mask to be applied to the detected region of the additional information.

The overlay image processing apparatus further inputs the first image and the generated mask to a second machine learning model, and causes the second machine learning model to output a second image in which the additional information is erased from the first image and a region where the additional information has been erased is inpainted.

Accordingly, it makes it possible to allow images overlayed with additional information to be reusable by erasing the additional information from the images more appropriately with higher accuracy. As a result, it contributes to improving the availability of images containing a variety of objects.

<Hardware Configuration of Overlay Image Processing Apparatus>

Figure 11:
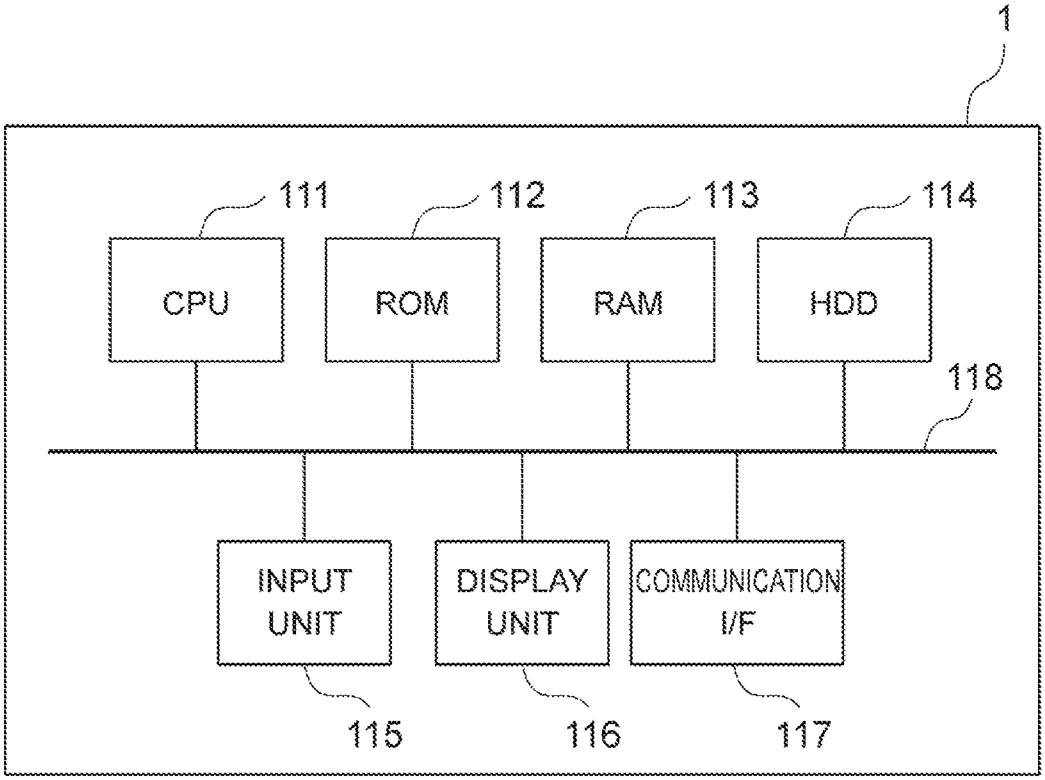
FIG. 11 is a block diagram illustrating an exemplary hardware configuration of the overlay image processing apparatus according to the respective embodiments of the present invention.

FIG. 11 is a diagram showing a non-limiting exemplary hardware configuration of the overlay image processing apparatus 1 according to the present embodiment.

The overlay image processing apparatus 1 according to the present embodiment can be implemented on any one or more computers, mobile devices, or any other processing platform.

Referring to FIG. 11, the overlay image processing apparatus 1 is shown as being implemented on a single computer, however, the overlay image processing apparatus 1 according to the present embodiment may be implemented on a computer system including multiple computers. The multiple computers may be inter-communicatively connected by a wired or wireless network.

As shown in FIG. 11, the overlay image processing apparatus 1 includes a CPU 111, a ROM 112, a RAM 113, an HDD 114, an input unit 115, a display unit 116, a communication I/F 117, and a system bus 118. The overlay image processing apparatus 1 may also incorporate an external memory.

The CPU 111 controls operations of the overlay image processing apparatus 1 in an integrated manner and controls the respective components (112 to 117) via the system bus 118 serving as a data transmission channel. It should be noted that, in place of or in addition to the CPU 111, the learning model controller apparatus 1 may also be equipped with a GPU (Graphics Processing Unit), and the GPU may be used to perform the learning and inference processing for a learning model such as the machine translation models 2 or 3.

The ROM (Read Only Memory) 112 is a non-volatile memory that stores a control program or the like required for CPU 111 to execute the processes. Instead, the program may be stored in a non-volatile memory such as the HDD (Hard Disk Drive) 114 or an SDD (Solid State Drive) or the like, or an external memory such as a removable storage medium (not shown).

The RAM (Random Access Memory) 113 is a volatile memory and functions as a main memory or a work area, or the like, for the CPU 111. In other words, the CPU 111 loads a required program or the like from the ROM 112 into the RAM 113 at the time of executing the processes and executes the program or the like to realize various functional operations.

The HDD 114 stores, for example, various data and various information required when the CPU 111 performs a process using a program. Furthermore, the HDD 114 stores, for example, various data and various information obtained by the CPU 111 performing a process using a program or the like.

The input unit 115 is constituted with a keyboard or a pointing device such as a mouse.

The display unit 116 is constituted with a monitor such as a liquid crystal display (LCD). The display unit 116 may provide a GUI (Graphical User Interface) for input various parameters used in the machine learning processing and communication parameters used in communication with external devices, and the like, to the overlay image processing apparatus 1.

The communication I/F 117 is an interface for controlling communication between the overlay image processing apparatus 1 and the external devices.

The communication I/F 117 provides an interface to the network and executes communication with external devices via the network. Image data, various parameters, and other data are sent and received to and from the external device via the communication I/F 117. According to the present embodiment, the communication I/F 117 may execute communication via a wired LAN (Local Area Network) that conforms to communication standards such as Ethernet (registered trademark) or leased line. However, the network available in the present embodiment is not limited thereto and may be constituted with a wireless network. The wireless network may include a wireless PAN (Personal Area Network) such as Bluetooth (registered trademark), ZigBee (registered trademark), UWB (Ultra Wide Band), and the like. The wireless network may also include a wireless MAN (Metropolitan Area Network) such as Wi-Fi (Wireless Fidelity) (registered trademark), and the like. The wireless network may further include a wireless WAN (Wide Area Network) such as LTE/3G, 4G, 5G, and the like. It should be noted that the network need only be capable of connecting respective devices and allowing them to communicate with each other, and the communication standards, scale, and configuration are not limited to the above.

Functions of at least some of the elements of the overlay image processing apparatus 1 shown in FIG. 1 may be realized by the CPU 111 executing programs. Nevertheless, at least a part of the functions of the elements of the overlay image processing apparatus 1 shown in FIG. 1 may operate as a dedicated hardware. In this case, the dedicated hardware operates based on the control of the CPU 111.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

EMBODIMENTS OF PRESENT DISCLOSURE

The present disclosure includes the following embodiments.

[1] An information processing apparatus, comprising: a region detection unit configured to input a first image containing an object and additional information to a first machine learning model and cause the first machine learning model to detect a region of the additional information; a mask generation unit configured to generate a mask to be applied to the region of the additional information from information of the region of the additional information detected by the region detection unit; and an image output unit configured to input the mask generated by the mask generation unit and the first image to a second machine learning model and cause the second machine learning mode to output a second image that is different from the first image, the second image being an image in which the additional information is erased from the first image and a region in the first image from which the additional information has been erased is inpainted.

[2] The information processing apparatus according to [1], wherein the region detection unit determines the region of the additional information based on a class of the additional information output from the first machine learning model.

[3] The information processing apparatus according to [1] or [2], wherein the mask generation unit adjusts the generated mask based on a class of the additional information output from the first machine learning model.

[4] The information processing apparatus according to [3], wherein the mask generation unit further adjust the generated mask based on a relative position between the object and the additional information.

[5] The information processing apparatus according to any one of [2] to [4], wherein the class of the additional information output from the first machine learning model includes at least one of a color of the additional information, a shape of the additional information, and a relative position between the region of the additional information and a periphery of the first image.

[6] The information processing apparatus according to any one of [2] to [5], wherein the first machine learning model is trained with the class of the additional information as input.

[7] The information processing apparatus according to any one of [2] to [6], wherein the first machine learning model is provided with an output channel configured to output the class of the additional information.

[8] The information processing apparatus according to any one of [1] to [7], further comprising: an image adjustment unit configured to adjust the object in the second image based on a relative position between the object and the additional information.

[9] The information processing apparatus according to [8], wherein the image adjustment unit adjust at least one of an arrangement of the object and a size of the object in the second image from which the additional information has been erased.

[10] The information processing apparatus according to any one of [1] to [8], wherein the second machine learning model is trained to have a smaller loss in a loss function that evaluates an adversarial loss and a perceptual loss for the second image.

[11] An information processing method executed by an information processing apparatus, comprising steps of: inputting a first image containing an object and additional information to a first machine learning model and causing the first machine learning model to detect a region of the additional information; generating a mask to be applied to the region of the additional information from information of the detected region of the additional information; and inputting the generated mask and the first image to a second machine learning model and causing the second machine learning mode to output a second image that is different from the first image, the second image being an image in which the additional information is erased from the first image and a region in the first image from which the additional information has been erased is inpainted.

[12] An information processing program product for causing a computer to execute information processing, the program product causing the computer to execute processing comprising: a region detection process for inputting a first image containing an object and additional information to a first machine learning model and causing the first machine learning model to detect a region of the additional information; a mask generation process for generating a mask to be applied to the region of the additional information from information of the region of the additional information detected by the region detection process; and an image output process for inputting the mask generated by the mask generation process and the first image to a second machine learning model and causing the second machine learning mode to output a second image that is different from the first image, the second image being an image in which the additional information is erased from the first image and a region in the first image from which the additional information has been erased is inpainted.

REFERENCE SIGNS LIST

1: Overlay Image Processing Apparatus; 2: Machine Learning Model for Region Detection; 3: Machine Learning Model for Image Inpainting; 11: Image Input Unit; 12: Region Detection Unit; 13: Mask Generation Unit; 14:

Image Inpainting Unit; 15: Output Unit; 16: Post-Processing Unit; 17: Pre-training Unit; 111: CPU; 112: ROM; 113: RAM; 124: HDD; 115: Input Unit; 116: Display Unit; 117: Communication I/F; 118: System Bus

What is claimed is:

1. An information processing apparatus, comprising:

at least one memory configured to store program code;

at least one processor configured to operate as instructed by the program code, the program code including:

detection code configured to cause at least one of the at least one processor to input a first image containing an object and additional information to a first machine learning model and cause the first machine learning model to detect a region of the additional information, the additional information comprising text or logo overlaid on the object;

classification code configured to cause at least one of the at least one processor to classify the region of the additional information into a plurality of classes including at least one of: a text class indicating the additional information having text content, a shape class indicating a shape of a frame surrounding text of the additional information, a color class indicating a color combination of the additional information, a position class indicating a relative position between the region of the additional information and a periphery of the first image, and a corner class indicating whether the region of the additional information is positioned at a corner of the first image;

generation code configured to cause at least one of the at least one processor to generate a mask, based on the plurality of classes that are classified, to be applied to the region of the additional information from information of the region of the additional information; and output code configured to cause at least one of the at least one processor to input the mask and the first image to a second machine learning model and cause the second machine learning mode to output a second image that is different from the first image, the second image being an image in which the additional information is erased from the first image and a region in the first image from which the additional information has been erased is inpainted, where in the generation code is further configured to cause at least one of the at least one processor to:

based on the region of the additional information being too distant from the object in the first image, adjust at least one of a size, shape, and arrangement of the mask such that the mask is larger to include regions where color of the object has changed due to color-bleeding to surrounding objects or background.

2. The information processing apparatus according to claim 1, wherein the generation code is further configured to cause at least one of the at least one processor to adjust the generated mask based on a class of the additional information output from the first machine learning model.

3. The information processing apparatus according to claim 2, wherein the generation code is further configured to cause at least one of the at least one processor to adjust the generated mask based on a relative position between the object and the additional information.

4. The information processing apparatus according to claim 1, wherein the first machine learning model is trained with the class of the additional information as input.

5. The information processing apparatus according to claim 1, wherein the first machine learning model is provided with an output channel configured to output the class of the additional information.

6. The information processing apparatus according to claim 1, further comprising:

adjustment code configured to cause at least one of the at least one processor to adjust the object in the second image based on a relative position between the object and the additional information.

7. The information processing apparatus according to claim 6, wherein the adjustment code is further configured to cause at least one of the at least one processor to adjust at least one of an arrangement of the object and a size of the object in the second image from which the additional information has been erased.

8. The information processing apparatus according to claim 1, wherein the second machine learning model is trained to have a smaller loss in a loss function that evaluates an adversarial loss and a perceptual loss for the second image.

9. The information processing apparatus according to claim 1, wherein the detection code is further configured to cause at least one of the at least one processor to distinguish between the additional information overlaid on the first image and information existed and displayed on the object that should not be erased.

10. The information processing apparatus according to claim 1, wherein the generation code is further configured to cause at least one of the at least one processor to adjust a shape of the mask from a rectangular shape to a shape that corresponds to a frame surrounding textual information in the additional information.

11. The information processing apparatus according to claim 1, wherein the generation code is further configured to cause at least one of the at least one processor to:

analyze a relative position between the object and the region of the additional information in the first image;

adjust at least one of a size, shape, and arrangement of the mask based on the analyzed relative position to optimize a target region for image inpainting;

prevents image degradation of the object after image inpainting by adjusting the mask to avoid the object when the mask overlaps the object in the first image.

12. An information processing method, performed by at least one processor and comprising:

inputting a first image containing an object and additional information to a first machine learning model and causing the first machine learning model to detect a region of the additional information;

classifying the region of the additional information into a plurality of classes including at least one of: a text class indicating the additional information having text content, a shape class indicating a shape of a frame surrounding text of the additional information, a color class indicating a color combination of the additional information, a position class indicating a relative position between the region of the additional information and a periphery of the first image, and a corner class indicating whether the region of the additional information is positioned at a corner of the first image;

generating a mask, based on the plurality of classes that are classified, to be applied to the region of the additional information from information of the detected region of the additional information, the additional information comprising text or logo overlaid on the object;

inputting the generated mask and the first image to a second machine learning model and causing the second machine learning mode to output a second image that is different from the first image, the second image being an image in which the additional information is erased from the first image and a region in the first image from which the additional information has been erased is inpainted, and based on the region of the additional information being too distant from the object in the first image, adjusting at least one of a size, shape, and arrangement of the mask such that the mask is larger to include regions where color of the object has changed due to color-bleeding to surrounding objects or background.

13. An non-transitory computer-readable information storage medium for storing a program that when executed by at least one processor, causes the at least one processor to:

classify the region of the additional information into a plurality of classes including at least one of: a text class indicating the additional information having text content, a shape class indicating a shape of a frame surrounding text of the additional information, a color class indicating a color combination of the additional information, a position class indicating a relative position between the region of the additional information and a periphery of the first image, and a corner class indicating whether the region of the additional information is positioned at a corner of the first image;

input a first image containing an object and additional information to a first machine learning model and cause the first machine learning model to detect a region of the additional information, the additional information comprising text or logo overlaid on the object;

generate a mask, based on the plurality of classes that are classified, to be applied to the region of the additional information from information of the region of the additional information;

input the mask and the first image to a second machine learning model and cause the second machine learning mode to output a second image that is different from the first image, the second image being an image in which the additional information is erased from the first image and a region in the first image from which the additional information has been erased is inpainted, based on the region of the additional information being too distant from the object in the first image, adjust at least one of a size, shape, and arrangement of the mask such that the mask is larger to include regions where color of the object has changed due to color-bleeding to surrounding objects or background.

* * * * *